(12) United States Patent
Tolksdorf

(10) Patent No.: US 10,263,557 B2
(45) Date of Patent: *Apr. 16, 2019

(54) DRIVE SYSTEM

(71) Applicant: Lenze Drives GmbH, Extertal (DE)

(72) Inventor: Andreas Tolksdorf, Hameln (DE)

(73) Assignee: Lenze Drives GmbH, Extertal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,618

(22) PCT Filed: May 8, 2014

(86) PCT No.: PCT/EP2014/059469
§ 371 (c)(1),
(2) Date: Nov. 6, 2015

(87) PCT Pub. No.: WO2014/180957
PCT Pub. Date: Nov. 13, 2014

(65) Prior Publication Data
US 2016/0094176 A1    Mar. 31, 2016

(30) Foreign Application Priority Data

May 8, 2013  (DE) .................. 10 2013 208 544

(51) Int. Cl.
*H02P 27/05* (2006.01)
*H02K 3/28* (2006.01)
(Continued)

(52) U.S. Cl.
CPC .............. *H02P 27/05* (2013.01); *H02K 3/28* (2013.01); *H02K 9/06* (2013.01); *H02P 9/007* (2013.01); *H02P 9/42* (2013.01); *H02P 25/22* (2013.01)

(58) Field of Classification Search
CPC .......... H02K 3/28; H02K 16/00; H02K 16/04; H02K 16/025; H02K 9/06; H02P 25/22; H02P 27/05; H02P 9/007; H02P 9/42
See application file for complete search history.

(56) References Cited

U.S. PATENT DOCUMENTS

| 3,531,701 A | * | 9/1970 | Fukuo | .................... | H02K 17/36 |
| | | | | | 318/45 |
| 4,392,099 A | * | 7/1983 | Kuniyoshi | ................ | H02P 6/20 |
| | | | | | 318/797 |

(Continued)

FOREIGN PATENT DOCUMENTS

| CN | 1823467 A | 8/2006 |
| CN | 101529713 A | 9/2009 |

(Continued)

OTHER PUBLICATIONS

"Physics of induction machine." ECE 411. University of Wisconsin. Sep. 2014. Lecture.*

(Continued)

*Primary Examiner* — Eduardo Colon Santana
*Assistant Examiner* — Said Bouziane
(74) *Attorney, Agent, or Firm* — Crowell & Moring LLP

(57) ABSTRACT

A drive system includes a three-phase motor having a shaft, a first three-phase stator winding, which is to be connected to a three-phase AC voltage grid, a second three-phase stator winding, which is to be connected to the three-phase AC voltage grid in such a way that a second stator rotating field is produced rotating in opposition with respect to a first stator rotating field, which is generated by the first stator winding, and a rotor winding system which is mechanically coupled in rotationally fixed fashion to the shaft. The drive system further includes at least one inverter, which is mechanically coupled in rotationally fixed fashion to the shaft and which is electrically coupled to the rotor winding (Continued)

system, wherein the at least one inverter is designed to generate actuation signals for the rotor winding system in such a way that a first rotor rotating field and a second rotor rotating field are generated, wherein the first rotor rotating field interacts with the first stator rotating field in such a way that a first motor speed and a first torque are produced, and wherein the second rotor rotating field interacts with the second stator rotating field in such a way that the first motor speed and a second torque are produced, wherein the second torque has an identical direction of action with respect to the first torque.

10 Claims, 3 Drawing Sheets

(51) Int. Cl.
  *H02K 9/06* (2006.01)
  *H02P 25/22* (2006.01)
  *H02P 9/00* (2006.01)
  *H02P 9/42* (2006.01)
  *H02K 16/00* (2006.01)

(56) References Cited

U.S. PATENT DOCUMENTS

| | | | |
|---|---|---|---|
| 4,625,160 A | 11/1986 | Hucker | |
| 4,701,691 A | 10/1987 | Nickoladze | |
| 4,806,841 A | 2/1989 | Lee et al. | |
| 6,278,211 B1 | 8/2001 | Sweo | |
| 6,856,040 B2* | 2/2005 | Feddersen | F03D 7/0224 290/44 |
| 7,439,713 B2 | 10/2008 | Dooley | |
| 7,518,256 B2 | 4/2009 | Juanarena Saragueta et al. | |
| 2002/0017892 A1 | 2/2002 | Arimitsu et al. | |
| 2004/0075415 A1* | 4/2004 | Sopko | H02P 25/18 318/772 |
| 2006/0006755 A1* | 1/2006 | Leijon | H02J 3/34 310/184 |
| 2009/0121482 A1* | 5/2009 | Rickard | F03B 15/00 290/44 |
| 2010/0097027 A1* | 4/2010 | Jackson | H02P 27/06 318/730 |
| 2010/0213782 A1* | 8/2010 | Nashiki | H02K 3/28 310/195 |
| 2013/0057195 A1* | 3/2013 | Ha | H02P 27/05 318/812 |
| 2015/0130386 A1* | 5/2015 | Zumstein | H02K 5/10 318/490 |
| 2015/0280506 A1* | 10/2015 | Cawthorne | H02K 1/165 290/53 |

FOREIGN PATENT DOCUMENTS

| | | |
|---|---|---|
| DE | 43 24 306 A1 | 1/1995 |
| DE | 600 19 730 T2 | 9/2005 |
| EP | 0 311 717 A1 | 4/1989 |

OTHER PUBLICATIONS

International Search Report (PCT/ISA/210) issued in PCT Application No. PCT/EP2014/059469 dated Dec. 11, 2014, with English translation (four (4) pages).

Yuefeng Liao, "Design of a Brushless Doubly-Fed Induction Motor for Adjustable Speed Drive Applications", IEEE, 1996, pp. 850-855.

Malik Naveed Ur Rehman, et al., "Brushless Doubly-fed Induction Machine with Rotating Power Electronic Converter for Wind Power Applications", IEEE, Aug. 20, 2011, XP032020184 (six (6) pages).

Dieter Seifert, "Energieerzeugung aus Wind-und Wasserkraft durch Kaskaden—schaltungen", Antriebstechnik, Vereinigte Fachverlage, vol. 40, No. 11, Nov. 1, 2001, XP001112017, pp. 59-64.

Michael S. Boger, et al., "General Pole Nmber Model of the Brushless Doubly-Fed Machine", IEEE Transactions on Industry Applications, vol. 31, No. 5, Sep. 1, 1995, XP000535579, pp. 1022-1028.

Malik Naveed-Ur-Rehman, et al., "Dynamic Modeling and Control of a Brushless Doubly-Fed Induction Generator with a Rotating Power Electronic Converter", IEEE, Sep. 2, 2012, XP032464824, pp. 900-906.

\* cited by examiner

DRIVE SYSTEM

BACKGROUND AND SUMMARY OF THE INVENTION

The invention relates to a drive system on the basis of a double-fed asynchronous motor.

In the so-called power converter cascade of a double-fed asynchronous motor, rotor currents or rotor powers occurring are generally dissipated via slip rings. However, the slip rings are susceptible to interference and maintenance.

The invention is based on the object of providing a drive system based on a double-fed asynchronous motor which does not require any slip rings and which has improved operational properties in comparison with conventional double-fed asynchronous motors.

The invention achieves this object by a drive system according to an embodiment of the invention.

The drive system has a three-phase motor and at least one inverter.

The three-phase motor conventionally has a shaft driven by said three-phase motor.

The three-phase motor furthermore has a first three-phase stator winding, which is conventionally to be connected or is connected directly to a three-phase AC voltage grid, in particular without an inverter interposed, in order to generate a first magnetic stator rotating field.

The three-phase motor furthermore has a second three-phase stator winding, which is to be connected to the three-phase AC voltage grid in such a way that a second magnetic stator rotating field rotating in opposition is produced with respect to the first magnetic stator rotating field, which is generated by means of the first stator winding.

The three-phase motor furthermore has a rotor winding system, which is mechanically coupled in rotationally fixed fashion to the shaft. The rotor winding system can have coil groups distributed uniformly over the rotor circumference.

The at least one inverter is mechanically coupled in rotationally fixed fashion to the shaft, i.e. rotates with the shaft, and is electrically coupled to the rotor winding system, wherein the at least one inverter is designed to generate actuation signals in the form of actuation voltages and/or actuation currents for the rotor winding system in such a way that a first rotor rotating field and a second rotor rotating field, which is different than the first rotor rotating field, are generated, wherein the first rotor rotating field interacts with the first stator rotating field in such a way that a first motor speed and a first torque are produced, and wherein the second rotor rotating field interacts with the second stator rotating field in such a way that the first motor speed and a second torque are produced, wherein the second torque has an identical direction of action or direction of rotation with respect to the first torque.

The two stator rotating fields rotate in opposition. This results in rectified torques between the synchronous speeds.

The at least one inverter can be designed to generate actuation signals for the rotor winding system in such a way that a rotor power transmitted via the first stator winding is compensated for by a rotor power transmitted via the second stator winding.

A common stator magnetic circuit or stator core circuit can be assigned to the first stator winding and the second stator winding, wherein the stator magnetic circuit can conventionally comprise laminate stacks, etc., for example. The first and second stator windings therefore form a stator winding system.

The first stator winding can have a first pole pair number p1, and the second stator winding can have a second pole pair number p2, where p1≠p2.

The rotor winding system can have 2* (p1+p2) coil groups distributed uniformly over a circumference of the rotor winding system.

The drive system can have precisely one inverter having at most 2*(p1+p2) phases or phase connections.

Precisely one single rotor magnetic circuit can be assigned to the rotor winding system. Alternatively, the rotor winding system can have a first rotor winding having an assigned first magnetic circuit and a second rotor winding, which is separate from the first rotor winding and has a second assigned magnetic circuit, which is separate from the first magnetic circuit.

The drive system can have a fan impeller driven by means of the shaft, wherein the at least one inverter is coupled in rotationally fixed fashion and is coupled thermally to the fan impeller. The inverter(s) can be fastened at or on the fan impeller, for example in any desired position, for example in the region of the center of rotation of the fan impeller or outside the center of rotation.

The inverter(s) can be integrated in the fan impeller, for example by virtue of the fan impeller forming a housing for the inverter(s).

BRIEF DESCRIPTION OF THE DRAWINGS

The invention will be described in detail below with reference to the drawings, in which, in each case schematically.

DETAILED DESCRIPTION OF THE EXEMPLARY EMBODIMENTS

Figure 1:
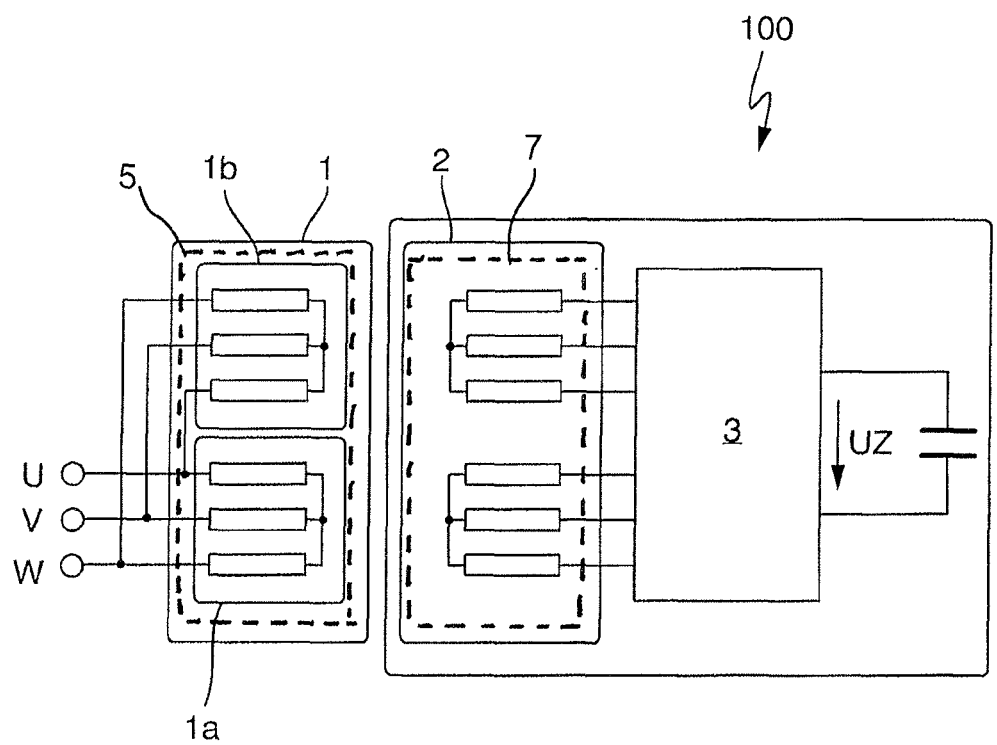
FIG. 1 shows a drive system according to the invention having two drive subsystems in accordance with a first embodiment.

FIG. 1 shows a drive system 100 according to an embodiment of the invention having a three-phase motor, which comprises a stator winding system 1 and a rotor winding system 2, and precisely one six-phase inverter 3, which generates actuation signals for the rotor winding system 2.

The three-phase motor conventionally has a shaft (not illustrated).

The stator winding system or stator stack 1 has a first three-phase stator winding 1a, which is conventionally connected directly, without an inverter interposed, to a three-phase AC voltage grid or to the phase voltages U, V and W thereof for generating a first stator rotating field.

The stator winding system 1 furthermore has a second three-phase stator winding 1b, which is connected to the three-phase AC voltage grid or the phase voltages U, V and W in such a way that a second magnetic stator rotating field rotating in opposition is produced with respect to the first stator rotating field, which is generated by means of the first stator winding 1a. In order for the magnetic stator rotating fields generated by means of the stator windings 1a and 1b to rotate in opposition, the stator windings 1a and 1b can be wound in opposition, for example.

A common stator magnetic circuit 5 (dashed line) or stator core circuit is assigned to the first stator winding 1a and the second stator winding 1b, wherein the stator magnetic circuit 5 or stator core circuit can conventionally have laminate stacks, etc., for example.

The rotor winding system or rotor stack 2 is mechanically coupled in rotationally fixed fashion to the shaft. Precisely one rotor magnetic circuit 7 (dashed line) or rotor core circuit is assigned to the rotor winding system or rotor stack 2. The rotor magnetic circuit or rotor core circuit can conventionally have laminate stacks, etc., for example.

The inverter 3 is mechanically coupled in rotationally fixed fashion to the shaft and is electrically coupled to the rotor winding system 2.

The inverter 3 generates actuation signals in the form of actuation voltages and/or actuation currents for the rotor winding system 2 in such a way that a first magnetic rotor rotating field and a second magnetic rotor rotating field, which rotates in opposition to the first rotor rotating field, are produced. The first rotor rotating field interacts with the first stator rotating field in such a way that a first motor speed and a first torque are produced. The second rotor rotating field interacts with the second stator rotating field in such a way that the first motor speed and a second torque are produced, wherein the second torque has an identical direction of action with respect to the first torque.

The first stator winding 1a has, by way of example, a first pole pair number p1 of one, and the second stator winding 1b has, by way of example, a second pole pair number p2 of two. The rotor winding system 2 has 2*(p1+p2)=6 coil groups distributed uniformly over a circumference of the rotor winding system 2. Correspondingly, the inverter has 2*(p1+p2)=6 associated phases or phase outputs, which are electrically connected to the associated coil groups, as shown.

In accordance with the invention, an inverter 3, which is arranged on the rotor side and is carried along by the (motor) shaft, of a double-fed asynchronous motor is controlled by a rotor winding system 2 in such a way that a rotor power transmitted via the first stator winding 1a is compensated for by a rotor power transmitted via the second stator winding 1b.

The two stator windings 1a and 1b are to be connected jointly to a three-phase grid having the phase voltages U, V, W and generate substantially sinusoidal line currents in said grid. Owing to the four-quadrant capability of the drive system 100, no additional measures such as braking choppers or resistors or electronics for energy recovery in generator operating states are furthermore required.

The invention is based on the principle of the power converter cascade in a double-fed asynchronous motor. The rotor currents and rotor powers occurring are not dissipated via slip rings, however, but by means of suitable actuation of the rotor winding system 2 in conjunction with the stator winding system 1.

The drive system 100 has two drive subsystems (submotors). In this context, the inverter generates actuation signals formed from a first actuation signal set and a second actuation signal set. The first drive subsystem comprises the first stator winding 1a and the rotor winding system 2, to which the first actuation signal set is applied by means of the inverter 3 so as to form the first submotor. The second drive subsystem comprises the second stator winding 1b and the rotor winding system 2, to which the second actuation signal set for forming the second submotor is applied by means of the inverter 3. The first actuation signal set effects the first rotor rotating field and the second actuation signal set effects the second rotor rotating field.

For p1=1 and p2=2, the following actuation signal sets result, by way of example, for the six coil groups:

$$U1 = \hat{u}_r * e^{j\omega_r t} + \hat{u}_l * e^{-j\omega_l t}$$

$$V1 = \hat{u}_r * e^{j(\omega_r t - \frac{2}{3}\pi)} + \hat{u}_l * e^{-j(\omega_l t + \frac{2}{3}\pi)}$$

$$W1 = \hat{u}_r * e^{j(\omega_r t - \frac{4}{3}\pi)} + \hat{u}_l * e^{-j(\omega_l t + \frac{4}{3}\pi)}$$

$$U2 = -\hat{u}_r * e^{j\omega_r t} + \hat{u}_l * e^{-j\omega_l t}$$

$$V2 = -\hat{u}_r * e^{j(\omega_r t - \frac{2}{3}\pi)} + \hat{u}_l * e^{-j(\omega_l t + \frac{2}{3}\pi)}$$

$$W2 = -\hat{u}_r * e^{j(\omega_r t - \frac{4}{3}\pi)} + \hat{u}_l * e^{-j(\omega_l t + \frac{4}{3}\pi)}$$

$\hat{u}_r$=amplitude of the 2-pole field
$\hat{u}_l$=amplitude of the 4-pole field
$\omega_r$=circuit frequency of the 2-pole field
$\omega_l$=circuit frequency of the 4-pole field The variables indexed by "r" denote the first actuation signal set and the variables indexed by "l" denote the second actuation signal set.

In the second drive subsystem on the same shaft, the rotor power transmitted via the first drive subsystem is transmitted back into the feeding grid, wherein a mechanical power is generated at the shaft with the same direction of action as by the first drive subsystem.

In accordance with the invention, a complementary operating point is set in the second drive subsystem. In this case, the operating point of the second drive subsystem is determined by means of control of the inverter 3 such that:
a) the speeds of the two submotors or drive subsystems are exactly identical, and
b) the sum of the two rotor powers is zero.

In order to be able to use two magnetic rotating fields which are in opposition but have the same frequency on a common stator winding system or stator stack 1, it is necessary to design the pole pair numbers of the two stator windings 1a and 1b to be different. Rotating fields of different pole pair numbers do not influence one another in a common magnetic circuit.

In order to set the complementary operating point of the second drive subsystem for the operating point of the first drive subsystem, the following holds true under the abovementioned condition a):

$$f_{WR2} = f_{grid} + \frac{p_1}{p_2}(f_{grid} - f_{WR1})$$

where p1 and p2 denote the pole pair numbers of the two stator windings 1a and 1b, $f_{wr1}$ denotes a frequency of a fundamental of the first actuation signal set which interacts with the p1-pole or first stator rotating field, and $f_{wr2}$ denotes a frequency of a fundamental of the second actuation signal set, which interacts with the p2-pole or second stator rotating field. Based on the abovementioned exemplary actuation signal sets, in this case the following hold true:

$\omega_r = 2*\pi*f_{WR1}$ $\omega_l = 2*\pi*f_{WR2}$

As long as p1≠p2 is selected, it is possible to apply both stator winding systems to a common core circuit.

As a result, a standing wave of the current linkage distribution which has p1+p2 nodes, i.e. precisely 3 nodes in the case of p1=1 and p2=2, for example, forms over the stator circumference. The maximum current linkage develops symmetrically between the nodes with the sum of the individual amplitudes of the fundamental current linkages. This behavior can additionally be used in the design of the common magnetic circuit.

Figure 2:
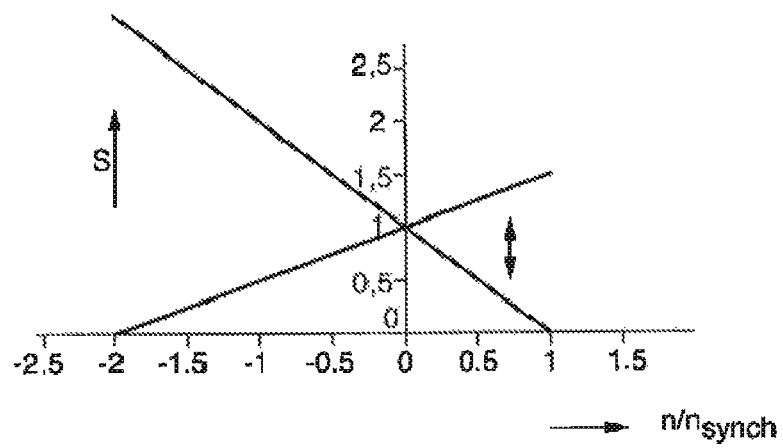
FIG. 2 shows complementary operating points of the drive subsystems shown in FIG. 1.

FIG. 2 shows the relationship between the required operating frequencies and speeds, where n denotes the speed, $n_{synch}$ denotes the synchronous speed, and s denotes the slip. FIG. 2 shows, by way of example, a representation of the two drive subsystems, as would be valid for the pole pair numbers p2/p1=½, for example.

It can be seen from FIG. 2 that there are precisely two operating points for each operating frequency or speed n, in each case one for each drive subsystem.

Figure 3:
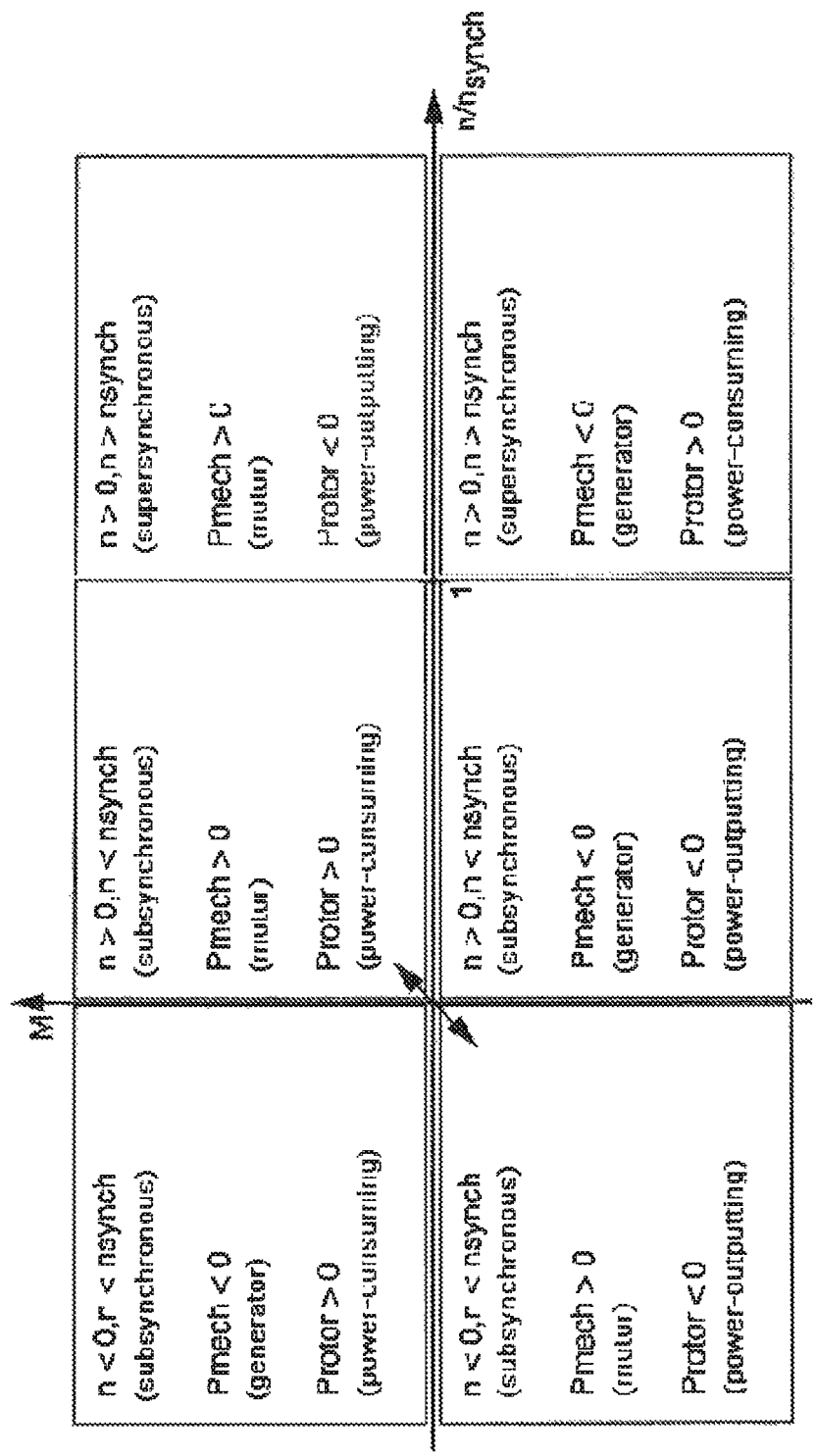
FIG. 3 shows directions of action of rotor powers in the operating quadrants of the drive system shown in FIG. 1.

FIG. 3 shows that, at these operating points, the rotor powers each have opposite mathematical signs given the same direction of action of the motor torque. This is because, for example, the first drive subsystem is operated in the first quadrant and the second drive subsystem is operated in the third quadrant.

The operating points of the drive subsystems are in the 2nd and 4th quadrants for the case of generator operation. Even during generator operation, the rotor powers have a complementary behavior with respect to one another.

It can be seen from FIG. 3 that complementary operating points with torques acting in the same direction cannot be found above the synchronous speeds. Speeds above the synchronous speed can be realized, however, with torques in the second drive subsystem which are in opposition to the desired useful torque. However, in the vicinity of the synchronous speed, only low rotor powers need to be handled in the complementary drive subsystem. Technically, the complete speed range between s2=0 and s1=0, where s1 is the slip in the drive subsystem 1 and s2 is the slip in the drive subsystem 2, can be realized with torques in the same direction.

By virtue of the fact that the two drive subsystems have a behavior as that of a general transformer, when the mains voltage is switched on on the stator side, first a DC-link capacitance is charged via freewheeling diodes (not shown) of the inverter 3 arranged on the rotor side. As long as the inverter 3 is not operated in clocked fashion, the rectified no-load voltage of the rotor side is set in the DC link. A rotational movement of the motor does not start.

An auxiliary voltage supply to the inverter 3 can take place via a tap of the DC-link voltage UZ. The necessary power is covered via unbalancing the power balance of the rotor power. This is also possible given a synchronous speed of one of the drive subsystems by virtue of the respective other drive subsystem.

Preferably, so-called vector regulations are used as operating or regulation methods for the inverter 3, which vector regulations make it possible to regulate the amplitudes and the phase angles of the rotor currents. The regulation methods for controlling a double-fed asynchronous machine have long been known and can also be used here.

The speed n=0 does not represent an extraordinary operating state for the drive system 100 according to the invention. Since the rotor currents to be regulated rotate at the line frequency in both drive subsystems, the difficulties otherwise existing in asynchronous motors when a motor standstill prevails with torque do not occur here. There is a soft transition between the motor operation and the generator operation. This has a particular significance for linear drives, for example.

At a standstill, the rotor power of a drive subsystem has a level which corresponds to the shaft output given a synchronous speed and the same torque. When losses in the system are left out of the equation, this rotor power results, at a standstill, in a torque with the same level in the second drive subsystem. This means that, during runup, each drive subsystem makes a 50% contribution to the required torque. This property makes it possible to use the drive system according to the invention for all applications in which high and also cyclical runup torques are required, and the torque requirement decreases as the speed increases, such as in many conveying and handling applications, for example.

The frequencies $f_{WR1}$ and $f_{WR2}$ of the rotor currents are impressed in both drive subsystems. On load, exclusively the amplitude and the angle of the rotor currents change, but not the frequency. An interruption-free change through all four operating quadrants is possible with this drive.

Changes in the line frequency result in a change in the speed. For the complementary operating point, however, the frequency $f_{WR2}$ needs to be adjusted in the case of a change in the line frequency in order to maintain the conditional equation (see above) for the complementary operating point. Since the degree of frequency adjustment is known from this, the frequency $f_{WR1}$ can also be adjusted correspondingly. The system then has a fixed speed behavior.

In principle, the topology of the inverter 3 is not restricted to voltage DC-link inverters. I converters and direct converters can likewise be used in principle.

A uniform utilization of the rotor winding system 2 and the associated inverter phases is achieved when the rotor winding system has 2*(p1+p2) coil groups distributed uniformly over the rotor circumference.

The inverter correspondingly needs to be configured as a 2*(p1+p2)-phase inverter.

With such a winding/converter arrangement, it is possible to accommodate both the p1-pole rotating field and the p2-pole opposing rotating field, which is impressed by the stator windings 1a and 1b, respectively.

Owing to the inverter 3, the fields belonging to $f_{WR1}$ and $f_{WR2}$ need to be modulated simultaneously.

The (p1+p2)-phase winding/inverter system can be divided virtually into two winding systems having a shift of 180° electrical (in the case of p1=1 and p2=2). Then, the actuation of these two virtual subsystems needs to be selected in such a way that the fundamental of the p1-pole field (p1<p2 is assumed) is modulated with a phase shift of 180° electrical (in the case of p1=1 and p2=2), and the fundamental of the p2-pole field is modulated without a phase shift into the two virtual subsystems.

Figure 4:
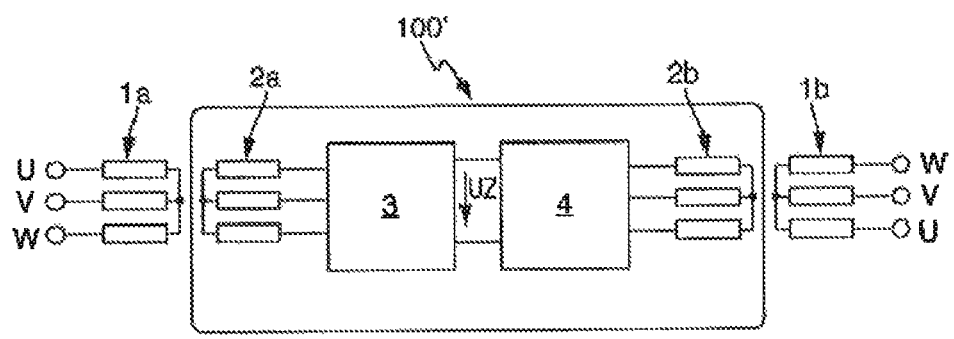
FIG. 4 shows a drive system in accordance with the invention having two drive subsystems in accordance with a further embodiment.

FIG. 4 shows a drive system 100' according to the invention comprising two drive subsystems in accordance with a further embodiment.

In contrast to the embodiment shown in FIG. 1, two inverters 3 and 4 are provided, wherein the first inverter 3 feeds a first rotor winding 2a, and the second inverter 4 feeds a second rotor winding 2b. The inverters 3 and 4 have a DC link.

A further difference with respect to the embodiment shown in FIG. 1 consists in that the stator windings 1a and 1b have magnetic circuits which are separate from one another, and the rotor windings 2a and 2b have magnetic circuits which are separate from one another. Furthermore, the stator windings 1a and 1b can have identical pole pair numbers.

In order to generate the magnetic stator rotating field rotating in opposition, the second stator winding 1b is connected in reverse sequence to the grid phases U, V and W with respect to the first stator winding 1a.

Moreover, that which has been said in respect of the embodiment shown in FIG. 1 applies correspondingly to the embodiment shown in FIG. 4.

By means of the invention, an asynchronous machine can be operated as a variable-speed drive on the constant-voltage grid in all four operating quadrants. Furthermore, feedbackless operation with a high degree of accuracy in respect of the speed is possible. Low speeds up to the standstill state and the change to the generator operating mode can be controlled. Only sinusoidal line currents occur, for system-related reasons, as a result of which the grid loading is considerably reduced.

Operation on the grid without reactive power is possible since the reactive power of the motor can be passed via the rotor-side inverter(s). As a result, the grid loading can be reduced further.

In comparison with conventional systems, the inverter can be dimensioned for relatively low powers since only the rotor power needs to be passed in the inverter(s).

Inexpensive power component parts with low losses and with a low rated voltage can be used since the rotor voltage can be determined via the turns ratio of the rotor/stator windings.

The EMC complexity involved can be reduced since switching is performed on the rotor side of the inverter.

Since the three-phase motor shown in FIG. 1 only has a single stator winding system or stator winding stack 1 and a single rotor winding system or rotor winding stack 2, necessary electronic components can be arranged and thermally encapsulated on an end side of the three-phase motor.

The invention claimed is:

1. A drive system, comprising:
   a) a three-phase motor, comprising:
      a shaft;
      a first three-phase stator winding, which is to be connected to a three-phase AC voltage grid to generate a first magnetic stator rotating field;
      a second three-phase stator winding, which is to be connected to the same three-phase AC voltage grid such that a second magnetic stator rotating field is generated, wherein the second magnetic stator rotating field rotates in opposition to the first magnetic stator rotating field; and
      a rotor winding system, which is mechanically coupled in rotationally fixed fashion to the shaft, and
   b) at least one inverter, which is mechanically coupled in rotationally fixed fashion to the shaft and which is electrically coupled to the rotor winding system, wherein
      the at least one inverter generates actuation signals for the rotor winding system such that a first magnetic rotor rotating field and a second magnetic rotor rotating field are generated,
      the first magnetic rotor rotating field interacts with the first magnetic stator rotating field such that a first motor speed and a first torque are produced, and wherein the second magnetic rotor rotating field interacts with the second magnetic stator rotating field such that the first motor speed and a second torque are produced, wherein the second torque has an identical direction of action with respect to the first torque, wherein the first stator winding has a first pole pair number p1, and the second stator winding has a second pole pair number p2, where p1≠p2, and
the rotor winding system has 2*(p1+p2) coil groups distributed uniformly over a circumference of the rotor winding system.

2. The drive system as claimed in claim 1, wherein the at least one inverter is designed to generate the actuation signals for the rotor winding system such that a rotor power transmitted via the first stator winding is compensated for by a rotor power transmitted via the second stator winding.

3. The drive system as claimed in claim 1, further comprising a common stator magnetic circuit assigned to the first stator winding and the second stator winding.

4. The drive system as claimed in claim 1, wherein the drive system has precisely one inverter having at most 2*(p1+p2) phases.

5. The drive system as claimed in claim 1, wherein precisely one rotor magnetic circuit is assigned to the rotor winding system.

6. The drive system as claimed in claim 1, wherein the drive system has precisely two inverters.

7. The drive system as claimed in claim 6, wherein the rotor winding system has a first rotor winding and a second rotor winding, which is separate from the first rotor winding.

8. The drive system as claimed in claim 1, further comprising a fan impeller driven by the shaft, wherein the at least one inverter is coupled in rotationally fixed fashion and coupled thermally to the fan impeller.

9. The drive system as claimed in claim 1, wherein the drive system has precisely one inverter having at most 2*(p1+p2) phases.

10. A drive system, comprising:
   a) a three-phase motor, comprising:
      a shaft;
      a first three-phase stator winding, which is to be connected to a three-phase AC voltage grid to generate a first magnetic stator rotating field;
      a second three-phase stator winding, which is to be connected to the same three-phase AC voltage grid such that a second magnetic stator rotating field is generated, wherein the second magnetic stator rotating field rotates in opposition to the first magnetic stator rotating field; and
      a rotor winding system, which is mechanically coupled in rotationally fixed fashion to the shaft, and
   b) at least one inverter, which is mechanically coupled in rotationally fixed fashion to the shaft and which is electrically coupled to the rotor winding system, wherein
      the at least one inverter generates actuation signals for the rotor winding system such that a first magnetic rotor rotating field and a second magnetic rotor rotating field are generated,
      the first magnetic rotor rotating field interacts with the first magnetic stator rotating field such that a first motor speed and a first torque are produced, and wherein the second magnetic rotor rotating field interacts with the second magnetic stator rotating field such that the first motor speed and a second torque are produced, wherein the second torque has an identical direction of action with respect to the first torque, wherein
      the first stator winding has a first pole pair number p1, and the second stator winding has a second pole pair number p2, where p1≠p2, and the drive system has precisely one inverter having at most 2*(p1+p2) phases.

* * * * *